(12) United States Patent
Blonde et al.

(10) Patent No.: US 10,319,105 B2
(45) Date of Patent: Jun. 11, 2019

(54) METHOD AND SYSTEM FOR CALIBRATING AN IMAGE ACQUISITION DEVICE AND CORRESPONDING COMPUTER PROGRAM PRODUCT

(71) Applicant: THOMSON LICENSING, Issy les Moulineaux (FR)

(72) Inventors: Laurent Blonde, Thorigne-Fouillard (FR); Mozhdeh Seifi, Thorigne-Fouillard (FR); Paul Kerbiriou, Thorigne-Fouillard (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 226 days.

(21) Appl. No.: 15/268,625

(22) Filed: Sep. 18, 2016

(65) Prior Publication Data
US 2017/0084033 A1 Mar. 23, 2017

(30) Foreign Application Priority Data

Sep. 17, 2015 (EP) ..................................... 15306443

(51) Int. Cl.
*G06T 7/60* (2017.01)
*H04N 17/00* (2006.01)
(Continued)

(52) U.S. Cl.
CPC ................ *G06T 7/60* (2013.01); *G06T 5/003* (2013.01); *G06T 5/20* (2013.01); *G06T 7/80* (2017.01);
(Continued)

(58) Field of Classification Search
CPC .. G06T 7/60; G06T 7/80; G06T 5/003; G06T 5/20; G06T 2200/21; G06T 2207/10052;
(Continued)

(56) References Cited

U.S. PATENT DOCUMENTS 6,963,331 B1 11/2005 Kobayashi
6,982,744 B2 1/2006 Jenkins
(Continued)

FOREIGN PATENT DOCUMENTS

CN 101299270 11/2008
CN 102663732 9/2012
(Continued)

OTHER PUBLICATIONS

Koppal et al., "Beyond Perspective Dual Photography with Illumination Masks", IEEE Transactions on Image Processing, vol. 24, No. 7, Jul. 2015, pp. 2083-2097.
(Continued)

*Primary Examiner* — Howard D Brown, Jr.
(74) *Attorney, Agent, or Firm* — Brian J. Dorini; Patricia A. Verlangieri

(57) ABSTRACT

A method of calibrating an image acquisition device is described. The method includes emitting at least one light source pattern in an object space of the image acquisition device, adjusting one of the source patterns until an image pattern of the source pattern formed on a sensor of the image acquisition device exhibit a shape which centroid corresponds to a centroid of a reference pixel of the sensor, called a target image pattern and analyzing the adjusted source pattern and estimating therefrom at least one characteristic of a pixel beam directed to the reference pixel from the adjusted source pattern.

15 Claims, 4 Drawing Sheets

(51) Int. Cl.
*G06T 5/00* (2006.01)
*G06T 5/20* (2006.01)
*G06T 7/80* (2017.01)
*H04N 5/228* (2006.01)

(52) U.S. Cl.
CPC ....... *H04N 17/002* (2013.01); *G06T 2200/21* (2013.01); *G06T 2207/10052* (2013.01); *G06T 2207/20036* (2013.01); *G06T 2207/20048* (2013.01)

(58) Field of Classification Search
CPC ........... G06T 2207/20048; G06T 2207/20036; H04N 17/002
See application file for complete search history.

(56) References Cited

U.S. PATENT DOCUMENTS

| | | | | |
|---|---|---|---|---|
| 8,315,476 | B1* | 11/2012 | Georgiev | H04N 5/23232 348/207.99 |
| 8,514,491 | B2 | 8/2013 | Duparre | |
| 2007/0133895 | A1* | 6/2007 | Kang | G06T 5/20 382/261 |
| 2013/0128068 | A1* | 5/2013 | Georgiev | H04N 9/045 348/222.1 |
| 2013/0128087 | A1* | 5/2013 | Georgiev | H04N 5/2254 348/307 |
| 2013/0222633 | A1* | 8/2013 | Knight | H04N 5/23212 348/222.1 |
| 2014/0176760 | A1* | 6/2014 | Taguchi | G06T 5/002 348/224.1 |

FOREIGN PATENT DOCUMENTS

| | | |
|---|---|---|
| EP | 2736262 | 5/2014 |
| JP | 4791449 | 10/2011 |
| JP | 2012205014 | 10/2012 |
| KR | 1020080001794 | 1/2008 |
| WO | WO2005094468 | 10/2005 |
| WO | WO2012011809 | 1/2012 |

OTHER PUBLICATIONS

Chrien etal.—"Contrasting target, stray-light, and other performance metrics for MISR"—International Geoscience and Remote Sensing Symposium IGARSS '94. Surface and Atmospheric Remote Sensing: Technologies, Data Analysis and Interpretation (pp. 2001-2003 vol. 4)—Aug. 8-12, 1994.
Okatani etal.—"A calibration system for multiple cameras and LED light sources in location-based information support system using the compact battery-less information terminal(CoBIT)"—SICE 2003 Annual Conference (pp. 1497-1501 vol. 2)—Aug. 4-6, 2003.
Thomason etal., "Calibration of a Microlens Array for a Plenoptic Camera", 52nd AIAA Aerospace Sciences Meeting, AIAA SciTech, Jan. 13-17, 2014.
Kannala etal.—"A generic camera model and calibration method for conventional, wide-angle, and fish-eye lenses" IEEE Transactions on Pattern Analysis and Machine Intelligence, vol. 28, Issue No. 8, pp. 1335-1340, Aug. 2006.
Knyaz—"Multi-media Projector—Single Camera Photogrammetric System for Fast 3D Reconstruction"—ISPRS—International Society for Photogrammetry and Remote Sensing Archives, Proceedings of the ISPRS Commission V Mid-Term Symposium 'Close Range Image Measurement Techniques', vol. XXXVIII part 5, pp. 343-348, Jun. 21-24, 2010.
Vaish etal.—"Using plane+ parallax for calibrating dense camera arrays"—Proceedings of the 2004 IEEE Computer Society Conference on Computer Vision and Pattern Recognition, CVPR 2004, vol. 1, pp. I-2. IEEE, Jun. 27-Jul. 2, 2004.
Georgiev etal.—"Spatio-Angular Resolution Tradeoffs in Integral Photography"—Proceedings of the 17th Eurographics Symposium on Rendering Techniques EGSR '06—pp. 263-272—Cyprus, Jun. 26-28, 2006.
Zhang—"A flexible new technique for camera calibration"—IEEE Transactions on Pattern Analysis and Machine Intelligence, vol. 22, Issue No. 11, pp. 1330-1334—Nov. 2000.
Wilburn etal.—"High performance imaging using large camera arrays"—ACM Transactions on Graphics (TOG), Proceedings of ACM SIGGRAPH 2005, vol. 24, Issue No. 3, pp. 765-776, Jul. 2005.
"Blind/Myopic Deconvolution"—Julian Christou—UCSC—Workshop on Adaptive Optics—PSF Reconstruction—May 10-12, 2004, Victoria, Canada http://cfao.ucolick.org/meetings/psf_reconstruction/pdf/christou.pdf.

* cited by examiner

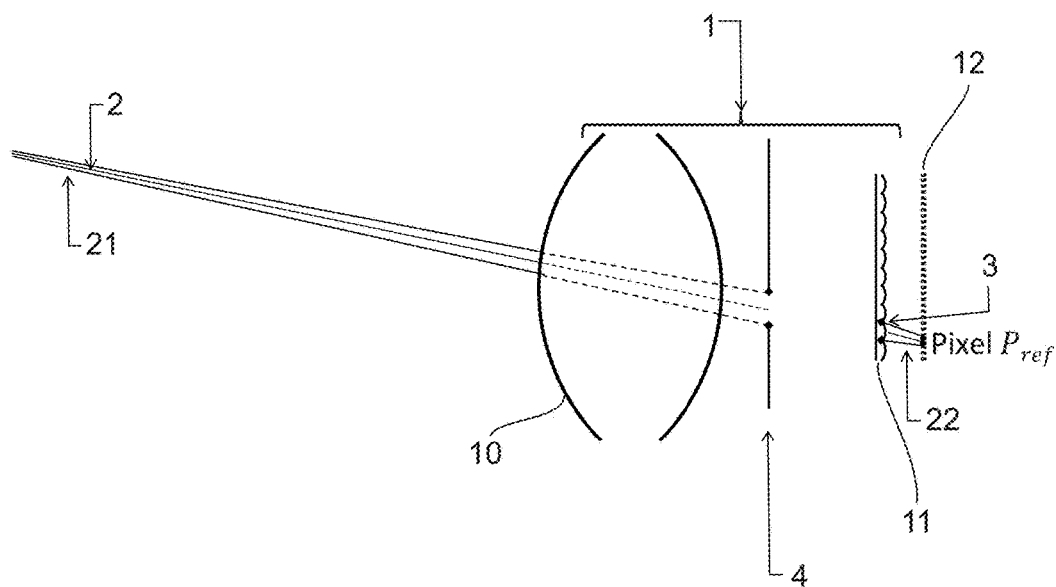
Fig. 1
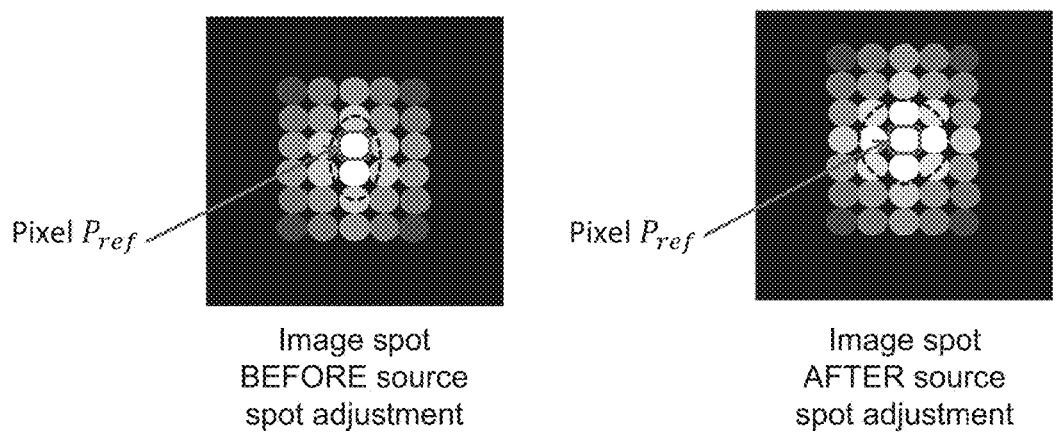
Image spot BEFORE source spot adjustment
Image spot AFTER source spot adjustment
Fig. 2A
Fig. 2B

METHOD AND SYSTEM FOR CALIBRATING AN IMAGE ACQUISITION DEVICE AND CORRESPONDING COMPUTER PROGRAM PRODUCT

This application claims the benefit, under 35 U.S.C. § 119 of European Patent Application No. 15306443.1, filed Sep. 17, 2015.

1. TECHNICAL FIELD

The present disclosure relates to image or video camera calibration. More precisely, the present disclosure generally relates to a method and a system for calibrating an image acquisition device, notably, but not exclusively, a plenoptic or multi-lens camera or a camera array.

2. BACKGROUND

The present section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Image acquisition devices project a three-dimensional scene onto a two-dimensional sensor. During operation, a conventional capture device captures a two-dimensional (2-D) image of the scene representing an amount of light that reaches a photosensor (or photodetector or photosite) within the device. However, this 2-D image contains no information about the directional distribution of the light rays that reach the photosensor (which may be referred to as the light-field).

Moreover, it is more and more frequent to post-process the image data captured by the sensor, and to run computational photography algorithms on the acquired signals.

However, in order for such image data processing to be performed correctly, it is necessary to have accurate calibration data relating to the image acquisition device used to capture such image or video data.

Notably, when considering a sensor device observing an object space from the image space of an optical system, it is necessary to estimate, for each pixel of the sensor, to which direction(s), or beam(s), it corresponds in the object space (i.e. which portion of the object space is sensed by this pixel). In the present disclosure, the terms "object space" and "image space" respectively stand for the input and output optical spaces usually defined in the optical design discipline. Hence, the "object space" is the observed scene in front of the main lens of an image acquisition device, while the "image space" is the optical space after the optical system of the image acquisition device (main lens, microlenses, . . . ) where the imaging photosensor captures an image.

Among the required calibration data, what is first needed is to identify the chief ray direction in the object space of the beam corresponding to a sensor pixel. A second need is to know the (angular) shape of the geometric beam surrounding the chief ray, and sensed by the pixel.

Such a need is well known in the art. In "Spatio-Angular Resolution Tradeoffs in Integral Photography", *Rendering Techniques* 2006 (2006): 263-272, Todor Georgeiv et al. express it as follows: "in order to reconstruct the true irradiance corresponding to the illuminated part of each pixel we would need to know exactly what percentage of it has been illuminated, and correct for that in software. In other words, we would need very precise calibration of all pixels in the camera. However, captured pixel values are affected by tiny misalignments: A misalignment of a micrometer can change a boundary pixel value by more than 10%. This problem gets very visible when the lenslets get smaller."

According to known prior art techniques, optical systems calibration mainly use checkerboards or grids of points in the object space to estimate the position of corners or intersection points on the acquired images in the image space. For a given optical configuration (a given zoom/focus of the optical acquisition device), grid points or corners positions are estimated with sub-pixel image processing techniques, and these estimates are provided to a model generalizing the estimated positions to the entire field of view.

Such a perspective projection model is usually taken as a starting point for optical acquisition devices calibration. It is then supplemented with distortion terms, in order to get very precise calibration of all pixels in the camera.

In "A Generic Camera Model and Calibration Method for Conventional, Wide-Angle, and Fish-Eye Lenses", *Pattern Analysis and Machine Intelligence, IEEE Transactions* on 28, no. 8 (2006): 1335-1340, Kannala et al. consider that the perspective projection model is not suitable for fish-eye lenses, and suggest to use a more flexible radially symmetric projection model. This calibration method for fish-eye lenses requires that the camera observe a planar calibration pattern.

In "Multi-media Projector-Single Camera Photogrammetric System For Fast 3d Reconstruction", *International Archives of Photogrammetry, Remote Sensing and Spatial Information Sciences, Commission V Symposium*, pp. 343-347. 2010, V. A. Knyaz proposes the use of a multimedia projector to simultaneously calibrate several cameras in a 3D reconstruction context.

Existing calibration methods hence rely on a global model transforming the geometry in the object space to the geometry in the image space. However, such prior art techniques are not suited for light field acquisition devices, which show a complex design and embed optical elements like lenslet arrays, which do not always follow specifications with all the required precision.

It is actually recalled that light-field capture devices (also referred to as "light-field data acquisition devices") have been designed to measure a four-dimensional (4D) light-field of the scene by capturing the light directions from different viewpoints of that scene. Thus, by measuring the amount of light traveling along each beam of light that intersects the photosensor, these devices can capture additional optical information (information about the directional distribution of the bundle of light rays) for providing new imaging applications by post-processing. The information acquired/obtained by a light-field capture device is referred to as the light-field data.

Light-field capture devices are defined herein as any devices that are capable of capturing light-field data. There are several types of light-field capture devices, among which:
  plenoptic devices, which use a microlens array placed between the image sensor and the main lens, as described in document US 2013/0222633;
  a camera array, as described by Wilburn et al. in "High performance imaging using large camera arrays." ACM Transactions on Graphics (TOG) 24, no. 3 (2005): 765-776 and in patent document U.S. Pat. No. 8,514, 491 B2.

For light field acquisition devices, a precise model of the optics (including defects such as microlens array deformations or misalignment) is more complex than with classical single pupil optical systems. Moreover, with light field acquisition devices, blur or vignetting can affect image forming, distorting the relationship between a source point and its image on the sensor. Last, the notion of stationary Point Spread Function, which is used when calibrating conventional image acquisition devices, does not hold for light field acquisition devices.

It is hence necessary to provide calibration techniques, which are suited for calibrating light field acquisition devices.

Specific calibration methods and models have hence been proposed for plenoptic or camera arrays acquisition, as in "Using Plane+Parallax for Calibrating Dense Camera Arrays", *Computer Vision and Pattern Recognition, 2004. CVPR 2004. Proceedings of the 2004 IEEE Computer Society Conference on*, vol. 1, pp. 1-2. IEEE, 2004 by Vaish et al. This document describes a procedure to calibrate camera arrays used to capture light fields using a planar+parallax framework.

However, such a technique does not allow determining with enough precision the chief ray position and direction estimation in the object space, nor the geometrical characteristics of the object space region seen by a given pixel. Such an object space region may also be called a pixel beam in the present disclosure.

It would hence be desirable to provide a new technique for calibrating image acquisition devices, which would allow calibrating light field acquisition devices, and which would not show the drawbacks of the prior art techniques. More precisely, it would be desirable to provide a new technique for calibrating image acquisition devices, which would allow estimating accurately characteristics of a pixel beam directed to a given pixel on a sensor of the image acquisition device.

3. SUMMARY

According to an embodiment, a method of calibrating an image acquisition device is provided, which comprises:
  emitting at least one light source pattern in an object space of the image acquisition device;
  adjusting one of the source patterns until an image pattern of the source pattern formed on a sensor of the image acquisition device exhibit a shape which centroid corresponds to a centroid of a reference pixel of the sensor, called a target image pattern;
  analyzing the adjusted source pattern and estimating therefrom at least one characteristic of a pixel beam directed to the reference pixel from the adjusted source pattern.

The present disclosure thus relies on a novel and inventive approach for calibrating image acquisition devices, whether conventional or light-field acquisition devices, which may be dedicated to capturing images and/or videos. In the foregoing, the generic term "image acquisition device" is used for designating all these devices, whatever their characteristics and features.

Actually, such a method, as will be apparent in the foregoing, allows improving the precision of the chief ray position and direction estimation over the prior art techniques, as well as knowing the geometrical characteristics of the pixel beam corresponding to a given pixel on the sensor.

It relies on a simple two-step approach, consisting in:
  adjusting a source spot to obtain an image spot exhibiting a shape centered on a reference pixel of the sensor;
  estimating pixel beam geometric characteristics from the source spot geometry and from knowledge on the optical system.

A multiple source point emitting device (for example several light sources arranged in a grid or lattice) of known relative position, emissive power and emitting diagram (or beam pattern) emit one or several light source patterns. In an embodiment, a monitor or projection display can be used. In another embodiment, a projector with corrected uniformity and using a diffusing screen is used to emit light source patterns.

The light source patterns are emitted toward an image acquisition device, such as a camera (with potentially multiple light paths), for which correspondence is sought between pixels on one or several sensor plane(s) and beams in the observed object space. The camera includes optical elements projecting the observed object space into the sensor plane(s) (e.g. including a main lens and optionally microlenses, or including multiple camera lenses like in a camera array configuration).

A light path is identified from the observed object space to the image plane, and is defined by an entrance pupil (e.g. one of multiple microlenses pupils retro-images or one of multiple cameras entrance pupils in a camera array. Actually, in plenoptic cameras, some pixels may have different light paths to the scene, e.g. through two or more microlenses).

By easy adjustment of the light source pattern (position and extension) so that the acquired image on the sensor has a defined shape, the method of the present disclosure allows to precisely characterize the pixel beam, which reaches a given pixel on the sensor.

By centroid of a shape, it is meant here, and throughout this document, the arithmetic mean position of all the points in the shape.

According to an embodiment, such a method also comprises determining a homomorphic transform between a source plane and an image plane of the image acquisition device, and said adjusting comprises iteratively modifying said source pattern to obtain said target image pattern, an inverse homomorphic transform of a difference between said image pattern and said target image pattern being determined at each iteration of said iteratively modifying step.

The method of the present disclosure thus relies on an initial phase, allowing determining a local source space to image space homomorphism, which may be done by classical calibration techniques. In an alternate embodiment, this homomorphism may be determined by emitting a non-symmetric light source pattern including several anchor points, and by estimating an homomorphic transform approximation between the source plane and the image plane linking the source and image patterns. This homomorphic transform can be approximated by knowing the optical system model for the given light path in the vicinity of the reference pixel and of the source point corresponding to this reference pixel.

This homomorphic transform is used in an iterative process of adjusting the light source pattern until the image pattern formed on the sensor shows the shape of a target image pattern. Such an iterative process allows achieving a great precision.

According to an embodiment, said target image pattern is an image pattern exhibiting central symmetry centered on the reference pixel. Hence, the centroid of the reference pixel corresponds to the center of symmetry of the target image pattern. According to an embodiment, analyzing the adjusted source pattern comprises determining a centroid of the adjusted source pattern, and the estimating comprises determining a chief ray of the pixel beam, said chief ray being defined by the centroid of the adjusted source pattern and by a center of an entrance pupil through which the pixel beam reaches the reference pixel.

Actually, the source spot centroid or maximum provides the intersection of the chief ray with the source plane. This intersection, combined with the light path entrance pupil center, provides the chief ray associated with the reference pixel.

According to an embodiment, said estimating also comprises:
 deconvolving the adjusted source pattern by an inverse homomorphic transform of the target image pattern, providing a local point spread function;
 convolving the local point spread function with a transform of a filter representing a pixel fill function providing a profile of the pixel beam for the reference pixel in the source plane.

Such an analysis of the resultant source spot and image spot patterns allows determining their extensions in the object and image spaces respectively.

By combining this pixel beam profile with the light path entrance pupil, the pixel beam is characterized. Knowledge of the optical design of the used optical system provides the light path entrance pupil characteristics and the information whether the pixel beam is converging or diverging when crossing the source plane. All pixel beam geometric characteristics are thus obtained.

According to another embodiment, such a method comprises alternately emitting a first light source pattern at a first distance to the image acquisition device in the object space and a second light source pattern at a second distance to the image acquisition device distinct from the first distance in the object space,
 said step of determining an image pattern and said step of adjusting the source pattern are carried out for the first light source pattern and for the second light source pattern with a first target image pattern for the first light source pattern and a second target image pattern for the second light source pattern both centered on a same reference pixel,
 and said analyzing step comprises analyzing the adjusted first source pattern and the adjusted second source pattern in order to estimate the at least one characteristic of the pixel beam directed to the reference pixel.

Hence, according to this embodiment, the method disclosed previously in this document is implemented with at least two source point emitting devices virtually placed at different distances from the image acquisition device to be characterized. The local source spot adjustment phase is achieved in two distinct source planes. It is hence not necessary anymore to have precise optical design knowledge in order to evaluate pixel beams geometry.

According to an embodiment, such a method also comprises:
 emitting a part of the first light source pattern and determining an associated first image pattern;
 evaluating a sign of a source versus image magnification from the part of the first light source pattern and from the associated first image pattern;
 emitting a part of the second light source pattern having the same geometry as the part of the first light source pattern, and determining an associated second image pattern;
 evaluating a sign of a source versus image magnification from the part of the second light source pattern and from the associated second image pattern; comparing both evaluated signs and determining therefrom a shape of the pixel beam between a plane located at the first distance and a plane located at the second distance.

Actually, if no knowledge about the optical design is available, an uncertainty remains about the beam shape when knowing only the profile of the beam in two section planes corresponding to both source planes. This uncertainty results from the position of the source planes relative to the plane of smallest cross-section in the beam (i.e. the focus point or reference pixel conjugate point).

However, if the source versus image magnification has the same sign for both light source patterns, it implies that the beam between both source planes has a truncated cone shape. On the contrary, if both magnifications have opposite signs, the reference pixel conjugate point is located between both source planes, and the beam between the first source plane and the second source plane has a double cone shape.

The present disclosure also concerns a computer program product downloadable from a communication network and/or recorded on a medium readable by a computer and/or executable by a processor, comprising program code instructions for implementing a method as described previously.

The present disclosure also concerns a non-transitory computer-readable medium comprising a computer program product recorded thereon and capable of being run by a processor, including program code instructions for implementing a method as described previously.

Such computer programs may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The present disclosure also concerns a system for calibrating an image acquisition device comprising:
 a first light source able to emit at least a first light source pattern in an object space of the image acquisition device;
 the image acquisition device comprising at least one sensor on which one of said emitted first light source patterns forms at least one first image pattern;
 a module for adjusting said first light source pattern until one of said first image patterns exhibit a shape which centroid corresponds to a centroid of a reference pixel of said sensor, called a target first image pattern;

an analyzing unit for analyzing the adjusted first light source pattern and for estimating therefrom at least one characteristic of a pixel beam directed to the reference pixel from the adjusted first light source pattern.

As described previously in relation with the corresponding method, the first light source may be a multiple source point emitting device (for example several light sources arranged in a grid or lattice). A monitor or projection display can also be used, as well as a projector with corrected uniformity and using a diffusing screen.

More generally, all the assets and features described previously in relation to the method for calibrating an image acquisition device also apply to the present system for calibrating an image acquisition device.

According to an embodiment, such a system also comprises a computing unit for determining a homomorphic transform between a source plane and an image plane of the image acquisition device, and said module for adjusting comprises a feedback loop for iteratively modifying the first light source pattern to obtain the target first image pattern, an inverse homomorphic transform of a difference between the first image pattern and the target first image pattern being determined at each iteration of said feedback loop.

According to an embodiment, said analyzing unit is able to determine:
 a centroid of said adjusted first light source pattern, and
 a chief ray of said pixel beam, said chief ray being defined by said centroid of said adjusted first light source pattern and by a center of an entrance pupil through which said pixel beam reaches said reference pixel.

According to an embodiment, said analyzing unit also comprises:
 a deconvolving module for deconvolving the adjusted first light source pattern by an inverse homomorphic transform of the target first image pattern, providing a local point spread function;
 a convolving module for convolving the local point spread function with a transform of a filter representing a pixel fill function, providing a profile of the pixel beam for the reference pixel in the source plane.

According to an embodiment, such a system also comprises a second light source able to emit a second light source pattern in an object space of the image acquisition device, the first light source being located at a first distance to the image acquisition device and the second light source being located at a second distance to the image acquisition device distinct from the first distance.

According to an embodiment, such a system also comprises a beam splitter separating the first and second light sources.

Such a beam splitter allows virtually placing the first and second light sources at different distances from the image acquisition device. For example, such a beam splitter separates two projection screens or monitors covering a same field of view and with emitting elements of similar angular resolution when observed from the acquisition device.

According to an embodiment, the second light source is located between the first light source and the image acquisition device, and the
 second light source is a screen able to take:
  a transparent state in which the first light source pattern travels through the screen towards the image acquisition device;
  an emitting state able to emit a second light source pattern in an object space towards the image acquisition device.

With this alternate embodiment, both light sources may be placed in the same direction with respect to the image acquisition device, at different distances, without the need to use a beam splitter.

According to an embodiment, such a system also comprises:
 an emitting control unit for controlling that the first light source emits a part of the first light source pattern;
 an emitting control unit for controlling that the second light source emits a part of the second light source pattern having the same geometry as the part of the first light source pattern;
 an evaluating module for evaluating a sign of a source versus image magnification from the part of the first light source pattern and from an associated first image pattern;
 an evaluating module for evaluating a sign of a source versus image magnification from the part of the second light source pattern and from an associated second image pattern;
 a comparison module for comparing both evaluated signs and determining therefrom a shape of the pixel beam between a plane located at the first distance and a plane located at the second distance.

It is to be understood that both the foregoing general description and the following detailed description are exemplary and explanatory and are not restrictive of the invention, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

4. BRIEF DESCRIPTION OF THE DRAWINGS

The invention can be better understood with reference to the following description and drawings, given by way of example and not limiting the scope of protection, and in which:

FIG. 1 depicts elements of a system for calibrating a plenoptic camera according to an embodiment of the present disclosure;

FIGS. 2A and 2B show the image spot formed on a sensor of the plenoptic camera of FIG. 1, respectively before and after source spot adjustment according to the method of the present disclosure;

Figure 3:
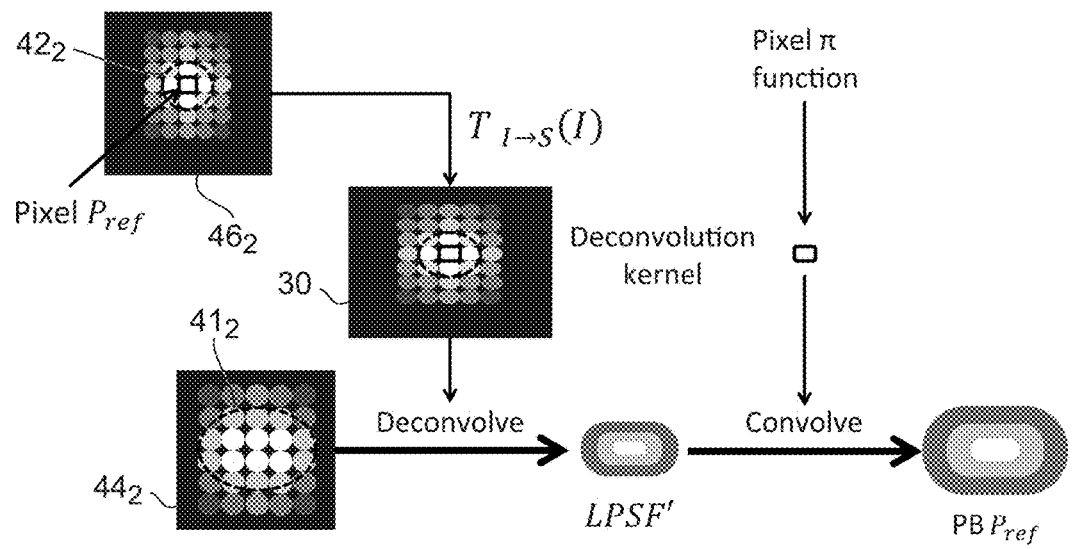
FIG. 3 is a schematic diagram illustrating the iterative process according to embodiments of the present disclosure for determining the pixel beam profile from source and image spots.

The components in the figures are not necessarily to scale, emphasis instead being placed upon illustrating the principles of the invention.

5. DETAILED DESCRIPTION

The present invention will be described more fully hereinafter with reference to the accompanying figures, in which embodiments of the invention are shown. This invention may, however, be embodied in many alternate forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

While not explicitly described, the present embodiments and variants may be employed in any combination or sub-combination.

It must be noted that, in the foregoing, the exemplary embodiments are described in relation to a light-field acquisition device, such as a plenoptic camera. However, the scope of the invention must not be limited to such plenoptic devices, and applies for any kind of image acquisition device, whether a conventional device or a light-field acquisition device.

FIG. 1 depicts elements of a system for calibrating a plenoptic camera according to an embodiment of the present disclosure.

Such a plenoptic camera is an optical system 1 comprising a main lens 10 (or a set of lenses, which may be represented synthetically as a single main lens), and a microlens array 11, located between the main lens 10 and a sensor 12.

The right hand side of FIG. 1 with respect to main lens 10 and microlens array 11 corresponds to the image space of the plenoptic camera, where the imaging photosensor 12 captures an image. The left hand side of FIG. 1 with respect to main lens 10 corresponds to the object space, i.e. the observed scene in front of the main lens.

For this plenoptic camera (with potentially multiple light paths), correspondence is sought between pixels on one or several sensor plane(s) and beams in the observed object space.

One or several light sources (not illustrated in FIG. 1) emit light from the object space towards optical system 1. A multiple source point emitting device of known relative position, emissive power and emitting diagram (beam pattern) may be used, which may consist for example in several light sources arranged in a grid or lattice. A monitor or projection display may also be used. In an embodiment, a projector with corrected uniformity and using a diffusing screen is used.

Part of the emitted light is received on a reference pixel $P_{ref}$ on sensor 12.

In order to calibrate the plenoptic camera of FIG. 1, it is important to identify the chief ray direction in the object space of the beam corresponding to reference pixel $P_{ref}$. It is also interesting to know the angular shape of the geometric beam surrounding the chief ray, and sensed by the reference pixel $P_{ref}$. Of course, such a calibration may be carried out for several reference pixels $P_{ref}$.

On FIG. 1, such a pixel beam comprises a part 21 located in the object space and a part 22 located in the image space. The chief ray of this pixel beam is denoted as 2.

It must be recalled that in plenoptic cameras, scene points may have different light paths to the sensor (e.g. through two or more microlenses 11). On FIG. 1, a given light path from the observed object space to the image plane is identified. Such a light path is defined by an entrance pupil, i.e.:
- a physical pupil 3, corresponding to a microlens belonging to microlens array 12;
- a virtual entrance pupil 4.

The light source and sensor 12 are supposed linear or calibrated to linear in their electronic signal to light amplitude transform (for the source) and light amplitude to electronic signal transform (for the sensor 12).

In order to properly calibrate plenoptic camera 1, an initial phase is carried out, aiming at determining a local source space to image space homomorphism. According to a first embodiment, such an initial phase is done by classical calibration technique to obtain extrinsic parameters, such as described for example by Zhang, Zhengyou in "A flexible new technique for camera calibration." Pattern Analysis and Machine Intelligence, IEEE Transactions on 22, no. 11 (2000): 1330-1334.

In another embodiment, such an initial phase is carried out as follows:
- A non-symmetric pattern including several anchor points is displayed with the emitting device (not shown). The pattern size and localization are designed so that the pattern is imaged on sensor 12 in the vicinity of a reference pixel $P_{ref}$
- An homomorphic transform approximation $T_{S \rightarrow I}$ is estimated between the source plane and the image plane linking the source and image patterns. Actually, this homomorphic transform is an isomorphism as it relates two planes. For example $T_{S \rightarrow I}$ is a linear transform represented by a 2×2 matrix transforming 2D coordinates of the source plane into 2D coordinates of the image plane. $T_{S \rightarrow I}$ can be approximated by knowing the optical system model for the given light path in the vicinity of $P_{ref}$ and of the source point corresponding to $P_{ref}$. Optimally $T_{S \rightarrow I}$ is invertible to give $T_{I \rightarrow S}$, the inverse transform from the image space to the source space.

Once this initial phase has been executed, a local source spot adjustment phase starts, which aims at precise pixel beam characterization:
- first, a source spot (composed of several source points) is switched on in the object space (step S1);
- this source spot may be imaged on several regions of the sensor 12. One of these regions is chosen, and the corresponding image spot is identified (step S2);

a close to central pixel is selected in the image spot, which is called a reference pixel $P_{ref}$ (step S3). For example, this reference pixel may be the image spot centroid nearest neighbor;

the source spot (namely, the source points intensities) is iteratively modified to obtain a (minimal radius) image spot exhibiting central symmetry centered on the reference pixel $P_{ref}$ (step S4). The inverse homomorphic transform $T_{I \rightarrow S}$ of the difference between the image spot and an optimally centered spot is used at each iterative step to adjust the source spot or source pattern.

FIGS. 2A and 2B show the image spot formed on sensor 12 of the plenoptic camera of FIG. 1, respectively before and after such a source spot adjustment. The image spot of FIG. 2A, before source spot adjustment, shows an ovoid shape, schematically illustrated in dashed lines, which surrounds two main pixels. The upper one is chosen as a reference pixel $P_{ref}$. The source spot will be iteratively adjusted, such that the image spot of FIG. 2A is transformed into the image spot of FIG. 2B, which centroid corresponds to, or is superposed with, the centroid of the reference pixel $P_{ref}$. On FIG. 2B, the image spot now shows a circular shape, also shown in dashed lines, which encloses five main pixels, and which center of symmetry corresponds to reference pixel $P_{ref}$.

More precisely, the iterative adjustment of the source pattern, in order to obtain a pixel centered and symmetric image pattern, may be carried out according to the following steps:

Step IA1: Estimate a translation and scaling in two directions between a given pixel region in image space and the corresponding pixel region of the source space (e.g. exploiting camera extrinsic parameters);

Step IA2: Define, in the image space coordinate system, a target image pattern (also called reference pattern), which is symmetric and centered on the given pixel, called a reference pixel;

Step IA3: Apply translation and scaling estimated at step IA1 to the reference pattern defined at step IA2, in order to transform it to the source space coordinate system;

Step IA4: Define the scaled pattern obtained at step IA3 as the initial source pattern;

Step IA5: Iterate the following sub-steps, starting with the initial source pattern at the first iteration:

Sub-step IA51:
Capture the image pattern formed on the sensor from the source pattern;
Break to step IA6 if the averaged pixel value difference between the captured image pattern and the target image pattern is lower than a threshold value (for example, lower than 5% of the target pattern peak value);

Sub-step IA52:
Compute a difference image between the target image pattern of step IA2 and the captured image pattern of step IA51;

Sub-step IA53:
On the difference image computed at sub-step IA52, determine a maximum positive difference position and amplitude (positive dirac);

Sub-step IA54:
On the difference image computed at sub-step IA52, determine a maximum negative difference position and amplitude (negative dirac);

Sub-step IA55:
Build a correction image convolving the combined positive and negative diracs with a circular Gaussian function of locally estimated standard deviation;

Sub-step IA56:
Scale and translate (with translation and scaling determined at step IA1) the correction image built at sub-step IA55;

Sub-step IA57:
Add the translated and scaled correction image obtained at sub-step IA56 to the current source pattern;

Step IA6: Store the last source pattern obtained, i.e. the source pattern yielding a captured image pattern, which averaged pixel value difference between the captured image pattern and the target image pattern is lower than a threshold value. The iteratively adjusted source pattern is thus obtained.

Step IA7: It is now possible to move to another pixel region.

Figure 4A:
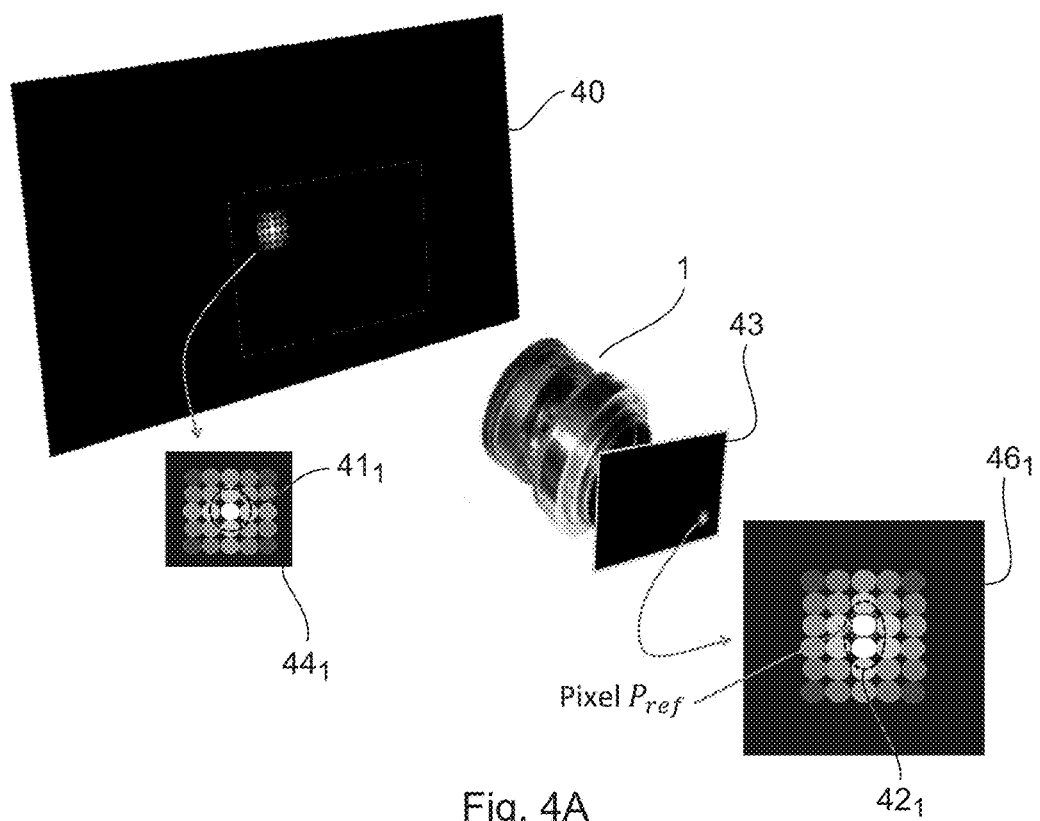
FIG. 4A illustrates the optical system for calibrating an image acquisition device according to an embodiment of the present disclosure, and notably the source and image spots before iterative adjustment.
Figure 4B:
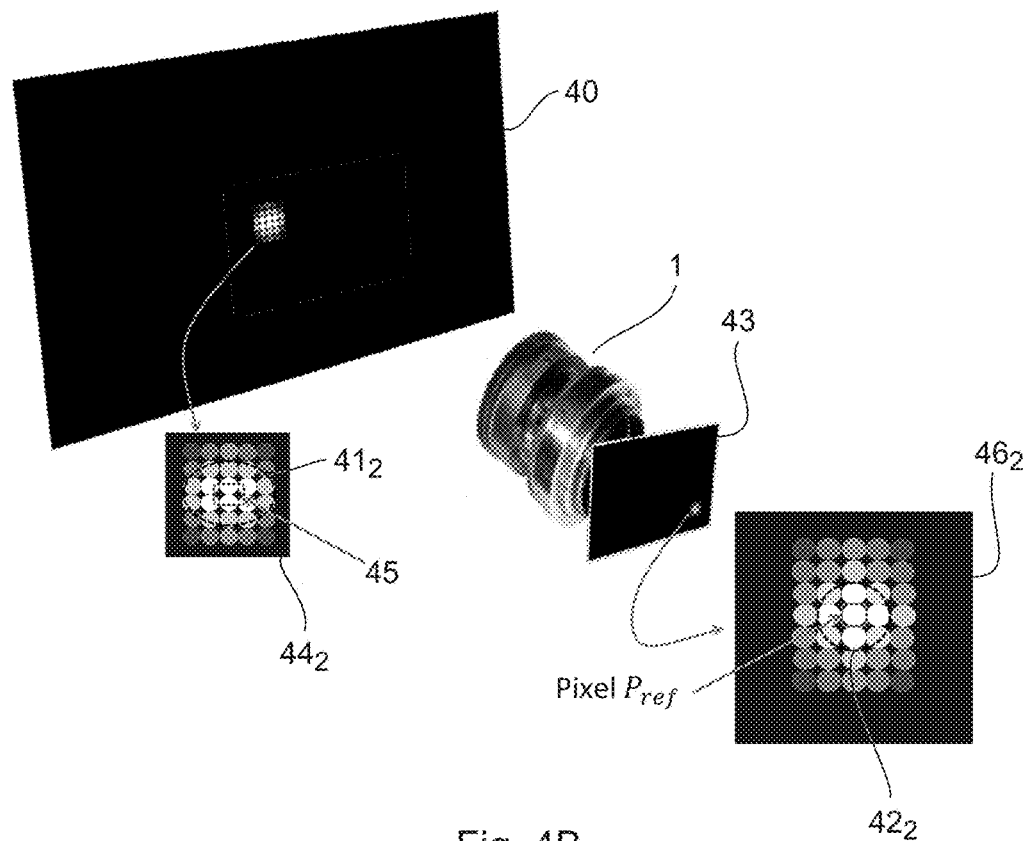
FIG. 4B illustrates the optical system for calibrating an image acquisition device according to an embodiment of the present disclosure, and notably the source and image spots after iterative adjustment.

FIGS. 4A and 4B schematically depict the optical system for calibrating the plenoptic camera of FIG. 1, and notably the source and image spots before and after iterative adjustment.

In the embodiment of FIGS. 4A and 4B, the light source is a screen 40 on which is displayed a source spot consisting in a 5×5 array 44₁ of source points of different intensities. As shown on FIG. 4A, before iterative adjustment, the source spot 41₁ shows an overall circular shape, shown in dashed lines. Light from source spot 41₁ travels through an optical system 1 (the plenoptic camera of FIG. 1, or more generally any kind of optical system of any type) and forms an image spot 42₁ on the focal plane 43 of the optical system 1. Before iterative adjustment of the source spot 41₁, image spot comprises a 5×6 array 46₁ of source point of different intensities and shows the ovoid shape 42₁ already described in relation to FIG. 2A.

As shown on FIG. 4B, after iterative adjustment, the image spot comprises a 5×7 array 46₂ of source points and now shows an overall circular shape 42₂, shown in dashed lines, and which center of symmetry corresponds to the centroid of reference pixel $P_{ref}$. Such an image spot 42₂ corresponds to the image spot already described in relation to FIG. 2B. However, the shape of the source pattern has also been modified: after iterative adjustment, the source spot 41₂ shows an elongated ovoid shape. Its size has also been modified and the source spot now consists in a 5×6 array 44₂ of source points of different intensities. Its centroid or maximum 45 provides the intersection of the chief ray 2 with the source plane. This intersection combined with the light path entrance pupil 4 center provides the chief ray 2 associated with pixel $P_{ref}$.

Hence, step S5 consists in analyzing the resultant source spot pattern, after iterative adjustment, to determine its centroid, in order to characterize its chief ray.

Step S6 comprises analyzing the resultant source spot and image spot patterns to determine their extensions in the object and image spaces respectively. It is schematically illustrated in FIG. 3.

The image spot/after source spot adjustment 42₂, 46₂, which is centered on the reference pixel $P_{ref}$, undergoes an inverse homomorphic transform $T_{I \rightarrow S}(I)$. A resultant spot 30, corresponding to the transform of the image spot to source plane, is obtained.

The source spot S after iterative adjustment 41₂, 44₂ is deconvolved by this resultant spot 30. This myopic (as $T_{I \rightarrow S}(I)$ is potentially inaccurate) deconvolution provides the local point spread function (LPSF') if light was travelling from image to source. It is actually recalled that myopic deconvolution occurs when the PSF (deconvolution kernel) is partially known. There is then the need to solve both the deconvolved object and the PSF (see for example http://cfao.ucolick.org/meetings/psf_reconstruction/pdf/christou.pdf).

The formula to invert to find LPSF' is:

$$S=LPSF'*T_{I\to}(I)+\varepsilon, \text{with '*' denoting convolution.}$$

This local point spread function LPSF' is then convolved with a transform of a box filter Π representing the fill function of the pixel, to give the pixel beam profile ($PBP_{ref}$) for $P_{ref}$ at source distance.

$$PBP_{ref}=LPSF'*T_{I\to S}(\Pi)$$

By combining this pixel beam profile $PBP_{ref}$ with the light path entrance pupil 4, the pixel beam is characterized. Knowledge of the optical design provides the light path entrance pupil characteristics and the information whether the pixel beam is converging or diverging when crossing the source plane. In this way, all $P_{ref}$ pixel beam geometric characteristics are obtained.

Figure 5:
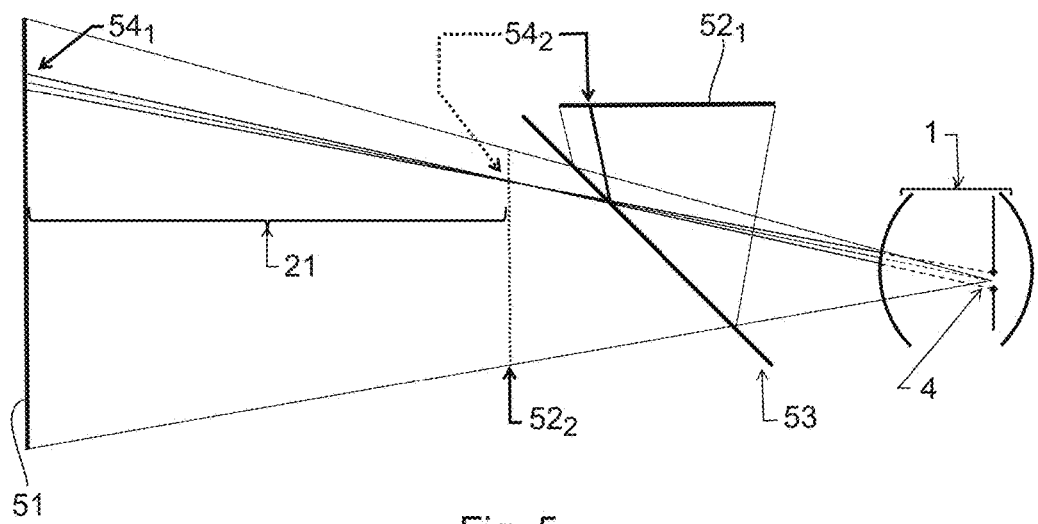
FIG. 5 depicts a calibration bench structure using two light sources according to an embodiment of the present disclosure.
Figure 6:
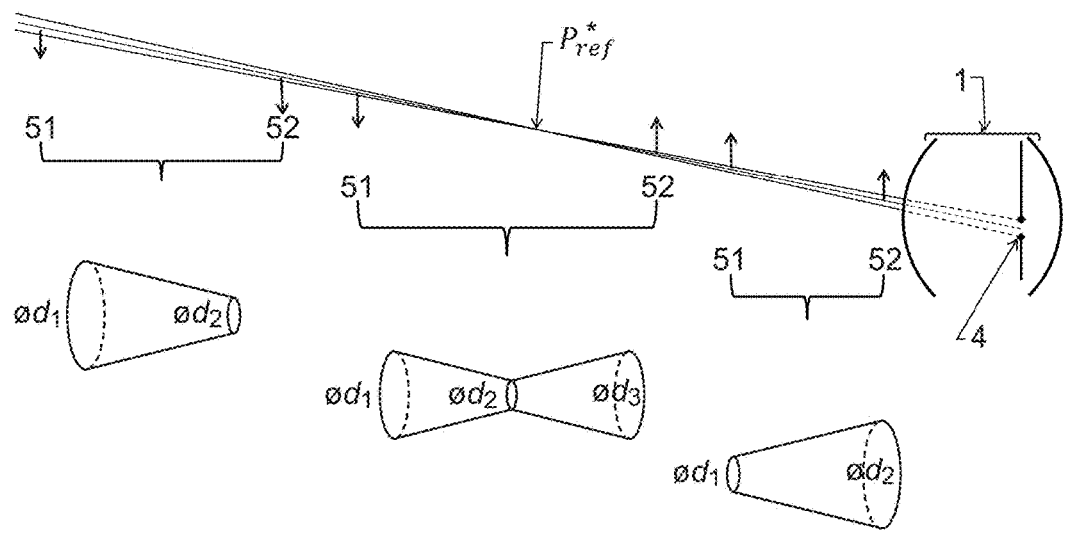
FIG. 6 illustrates the pixel beam shape depending on the positions of the source planes of FIG. 5.

FIGS. 5 and 6 describe an alternate embodiment, according to which it is not necessary to have knowledge of the optical system design (knowledge of the entrance pupil of a determined light path) to fully characterize the pixel beam.

Actually, as in multiple lens systems, in plenoptic cameras or camera arrays, the realization of the optical system might differ from its optical design, and knowing exactly where pupil entrances are is a challenge in terms of optical modeling. For example, a plenoptic system may be described with a hundred entrance pupils defining a hundred light paths, e.g. in a 10×10 grid.

FIG. 5 depicts an alternate embodiment to FIG. 1, in which at least two source point emitting devices are virtually placed at different distances from the camera device 1 to be characterized and calibrated.

Like in the embodiment of FIG. 1, the light sources of FIG. 5 are multiple source point emitting devices (for example several light sources arranged in a grid or lattice) of known relative position, emissive power and emitting diagram (beam pattern). As well, a monitor or projection display can be used. A projector with corrected uniformity and using a diffusing screen is an advantageous solution.

The source point emitting devices are placed at two distinct distances of the camera to calibrate, for example covering a same field of view and with emitting elements of the similar angular resolution when observed from the acquisition device. A first light source is located at source plane 51, while a second light source is located at source plane $52_1$. In the exemplary embodiment of FIG. 5, the light sources are two projection screens or monitors, with the second light source $52_1$ being redirected by means of a beam splitter 53. Hence, plane $52_1$ corresponds to the actual source plane of the second light source, while plane $52_2$ corresponds to its virtual position, as induced by the use of the beam splitter 53.

Like in the embodiment of FIG. 1, optical system 1 designates a camera (with potentially multiple light paths) for which correspondence is sought between pixels on one or several sensor plane(s) and beams in the observed object space.

Numerical reference $54_1$ designates a source spot on the first source plane 51, while numerical reference $54_2$ designates a source spot on the second source plane $52_1$, $52_2$. Source spots $54_1$ and $54_2$, located at different distances from optical system 1, are displayed sequentially, and they are both iteratively adjusted, as described previously in relation to FIGS. 1 to 4B.

More precisely:
at step S51, a source spot $54_1$ is switched on, in the first source plane 51;
previously described steps S2 to S4 are applied for a reference pixel $P_{ref}$ with source spot $54_1$ (step S52). In other words, an image spot resulting from source spot $54_1$ is chosen (step S2), a close to central pixel is selected in the image spot, which is called a reference pixel $P_{ref}$ (step S3) and the source spot $54_1$ is iteratively modified to obtain an image spot exhibiting central symmetry centered on the reference pixel $P_{ref}$ (step S4). The inverse homomorphic transform $T_{I\to S}$ of the difference between the image spot and an optimally centered spot is used at each iterative step to adjust the source spot or source pattern;
at step S53, the iteratively adjusted source spot $S_1$ for source plane 51 is stored (in other words, the digital counts defining the shape and position of the spot are recorded);
at step S54, the first light source in source plane 51 is switched off;
at step S55, a source spot $54_2$ is switched on in source plane $52_1$ (and hence in virtual source plane $52_2$, thanks to beam splitter 53). Source spot $54_2$ is homologous to the stored source spot $S_1$ for the first source plane 51;
at step S56, with a coarse systematic or iterative method, the source spot $54_2$ on source plane $52_1$ is modified to place the corresponding image spot in the vicinity of the reference pixel $P_{ref}$;
previously described steps S2 to S4 (or previously described step S52) are then applied for the reference pixel $P_{ref}$ with the modified source spot on source plane $52_1$ (step S57). It yields an iteratively adjusted source spot S2 for source plane $52_1$, $52_2$;
at step S58, the iteratively adjusted source spot $S_2$ for source plane $52_1$, $52_2$ is stored (in other words, the digital counts defining the shape and position of the spot are recorded);
at step S59, the light source in source plane $52_1$, $52_2$ is switched off;
at step S60, the resultant source spots data patterns $S_1$ and $S_2$ are analyzed to determine their extension in the first and second source planes 51 and $52_1$, $52_2$ respectively (in accordance with the method described previously in relation to step S6, FIG. 3). More precisely:
the $S_1$ and $S_2$ source spots maxima are joined to provide the chief ray associated with pixel $P_{ref}$;
the deconvolution of each source spot by the inverse transform of the image spot provides the pixel beam profile for $P_{ref}$ at the first source plane 51 distance and at the second source plane $52_1$, $52_2$ distance.

Such a use of at least two source planes allow a very precise identification of the chief ray and of the beam lateral extensions, even without knowledge of the optical design of optical system 1. However, an uncertainty remains about the beam shape when knowing only the profile in two section planes, as illustrated in FIG. 6. This uncertainty results from the position of the source planes relative to the plane of smallest cross-section in the beam, corresponding to the focus point or to the reference pixel $P_{ref}$ conjugate point.

Actually, as may be observed in FIG. 6:
when the first and second source planes 51 and 52 are both located at a distance to optical system 1, which is greater than the distance from the reference pixel conjugate point $P_{ref}*$ to optical system 1 (left hand side part of FIG. 6), the pixel beam between the first and second source planes 51 and 52 has a truncated cone shape, with a diameter $d_1$ at first source plane 51 greater than its diameter $d_2$ at second source plane 52;

when the first and second source planes 51 and 52 are both located at a distance to optical system 1, which is smaller than the distance from the reference pixel conjugate point $P_{ref}*$ to optical system 1 (left hand side part of FIG. 6), the pixel beam between the first and second source planes 51 and 52 also has a truncated cone shape, but with a diameter $d_1$ at first source plane 51 smaller than its diameter $d_2$ at second source plane 52;

however, when the reference pixel conjugate point $P_{ref}*$ is located between the first source plane 51 and the second source plane 52, the beam between the first source plane 51 and the second source plane 52 has a double cone shape.

In order to remove uncertainty in the beam shape, some steps may be added in the process described in relation with FIG. 5:

after step S53, only part of the stored source spot S1 is displayed (step S531). For example, a vertical half $S_{1:2}$ of stored source spot S1 is displayed in the first source plane 51. The resulting image spot data $I_{1:2}$ is stored (step S532);

after step S58, a part of the stored source spot S2 showing the same geometry as the part of the stored source spot S1 displayed at step S531 is displayed (step S581). For example, once again, a vertical half $S_{2:2}$ of stored source spot S2 is displayed in the second source plane 52. The resulting image spot data $I_{2:2}$ is stored (step S582);

at step S61 following step S60, one evaluates from $S_{1:2}$ and $I_{1:2}$ on the one hand, and from $S_{2:2}$ and $I_{2:2}$ on the other hand, if the source versus image magnification has the same sign or not for the first source plane 51 and the second source plane 52:

if the source versus image magnifications show the same sign, the pixel beam between first source plane 51 and second source plane 52 has a truncated cone shape;

if the source versus image magnifications show different signs, the plane of smallest cross-section in the beam is located between the first and second source planes: the pixel beam between the first source plane 51 and the second source plane 52 has a double cone shape.

Thanks to this embodiment, it is hence possible to derive the whole pixel beam characteristics for a given reference pixel on the sensor, even without knowledge of the optical design of the image acquisition device to be calibrated.

In an alternate embodiment to FIG. 5, it is possible to design a calibrating system, which does not comprise any beam splitter 53, if the second light source is a specific screen able to take:

a transparent state in which the light emitted on the first source plane 51 travels through the screen 52 towards the image acquisition device 1;

an emitting state able to emit light towards the image acquisition device 1.

Such a specific screen is then placed in the virtual second source plane $52_2$ on FIG. 5. When the first source spot $54_1$ is switched on, the screen in the second source plane $52_2$ is in its transparent state. Once the first source spot $54_1$ has been switched off, the screen in the second source plane $52_2$ starts emitting a second source spot $54_2$ towards optical system 1.

Except for the use of this specific screen, all the steps and features described previously in relation to FIGS. 5 and 6 are executed and apply in the same way.

In another alternate embodiment to FIG. 5, it is also possible to:

execute previously described steps S51 to S54 for a first light source; insert a screen as a second light source between the first light source and the device to be calibrated;

execute steps S55 to S59 for this added screen;

then execute step S60.

In yet another alternate embodiment to FIG. 5, it is also possible to use only one screen as both the first light source and the second light source. The screen is first located at the first distance to the image acquisition device. Steps S51 to S54 are carried out for the screen in this first position. The screen is then displaced from the first position to a second position, at a second distance to the image acquisition device. Steps S55 to S59 are then carried out for the screen located at the second distance to the image acquisition device. Step S60 is then executed.

These last two embodiments require a high precision in locating the screens at their exact position.

All the steps and features described previously in relation to FIGS. 5 and 6 also apply for these last two embodiments.

Figure 7:
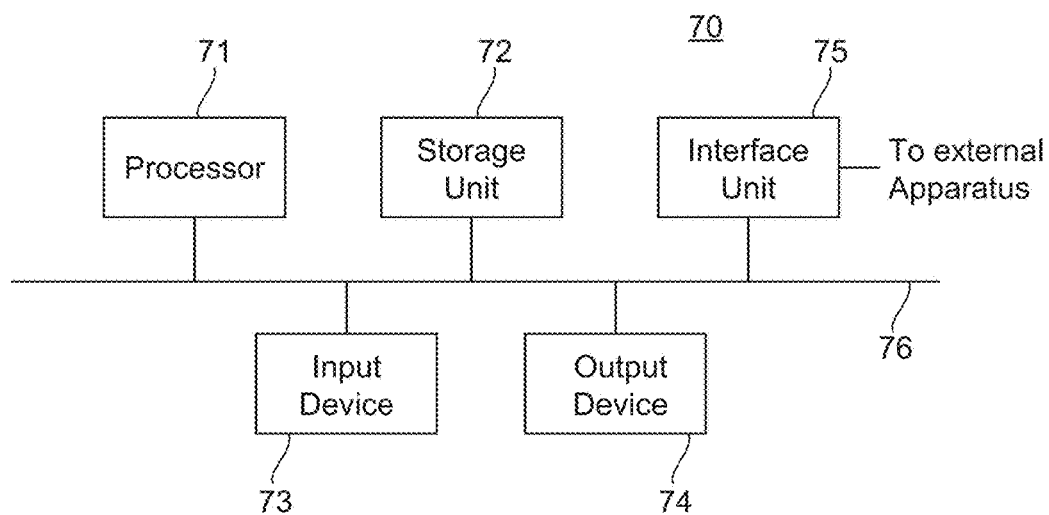
FIG. 7 illustrates a schematic block diagram illustrating an example of part of a system for calibrating an image acquisition device according to the present disclosure.

FIG. 7 shows a schematic block diagram illustrating an example of parts of a system for calibrating an image acquisition device according to an embodiment of the present disclosure.

An apparatus 70 illustrated in FIG. 7 includes a processor 71, a storage unit 72, an input device 73, an output device 74, and an interface unit 75 which are connected by a bus 76. Of course, constituent elements of the computer apparatus 70 may be connected by a connection other than a bus connection using the bus 76.

The processor 71 controls operations of the apparatus 70. The storage unit 72 stores at least one program to be executed by the processor 71, and various data, including data relating to the adjusted source spots, parameters used by computations performed by the processor 71, intermediate data of computations performed by the processor 71, and so on. The processor 71 may be formed by any known and suitable hardware, or software, or a combination of hardware and software. For example, the processor 71 may be formed by dedicated hardware such as a processing circuit, or by a programmable processing unit such as a CPU (Central Processing Unit) that executes a program stored in a memory thereof.

The storage unit 72 may be formed by any suitable storage or means capable of storing the program, data, or the like in a computer-readable manner. Examples of the storage unit 72 include non-transitory computer-readable storage media such as semiconductor memory devices, and magnetic, optical, or magneto-optical recording media loaded into a read and write unit. The program causes the processor 71 to perform a process for calibrating an image acquisition device according to an embodiment of the present disclosure as described previously.

The input device 73 may be formed by a keyboard, a pointing device such as a mouse, or the like for use by the user to input commands. The output device 74 may be formed by a display device to display, for example, the calibration data of the image acquisition device, including the geometric characteristics of the pixel beams. The input device 73 and the output device 74 may be formed integrally by a touchscreen panel, for example.

The interface unit 75 provides an interface between the apparatus 70 and an external apparatus. The interface unit 75 may be communicable with the external apparatus via cable or wireless communication. In this embodiment, the external apparatus may be the image acquisition device 1 and the light sources 40, 51, 52. In this case, the adjusted source spots displayed by the light sources 40, 51, 52 can be input from the light sources to the apparatus 70 through the interface unit 75, then stored in the storage unit 72.

Although only one processor 71 is shown on FIG. 7, it must be understood that such a processor may comprise different modules and units embodying the functions carried out by apparatus 70 according to embodiments of the present disclosure, such as:
- a module for adjusting the light source pattern(s) until one of the corresponding image patterns exhibit a shape which centroid corresponds to a centroid of a reference pixel of the sensor of image acquisition device 1;
- an analyzing unit for analyzing the adjusted light source pattern and for estimating therefrom characteristics of a pixel beam directed to the reference pixel from the adjusted first light source pattern.

In a specific embodiment, such a processor 71 also comprises a computing unit for determining a homomorphic transform between a source plane and an image plane of the image acquisition device, and the module for adjusting comprises a feedback loop for iteratively modifying the light source pattern to obtain the target image pattern, which makes use of an inverse homomorphic transform of a difference between the image pattern and the target image pattern.

In a specific embodiment, which may be combined with the previous one, the analyzing unit also comprises:
- a deconvolving module for deconvolving the adjusted light source pattern by an inverse homomorphic transform of the target image pattern, providing a local point spread function;
- a convolving module for convolving the local point spread function with a transform of a filter representing a pixel fill function, providing a profile of the pixel beam for the reference pixel in the source plane.

In another specific embodiment corresponding to the process previously described in relation to FIGS. 5 and 6, the processor 71 may also comprise:
- an emitting control unit for controlling that a first light source emits a part of a first light source pattern;
- an emitting control unit for controlling that a second light source emits a part of a second light source pattern having the same geometry as the part of the first light source pattern;
- an evaluating module for evaluating a sign of a source versus image magnification from the part of the first light source pattern and from an associated first image pattern;
- an evaluating module for evaluating a sign of a source versus image magnification from the part of the second light source pattern and from an associated second image pattern;
- a comparison module for comparing both evaluated signs and determining therefrom a shape of the pixel beam between a plane located at the first distance (distance from the first light source to the image acquisition device) and a plane located at the second distance (distance from the second light source to the image acquisition device).

In such an embodiment, whether using a beam splitter or a transparent screen, a correction module is added on the measured/computed first light source pattern centroid positions to compensate for the deviation of light produced by refraction caused by either the beam splitter or the second light source glass substrate when traversed by the first light source emitted light.

These modules and units may also be embodied in several processors 71 communicating and co-operating with each other.

The present disclosure thus provides a system and method allowing precise identification of chief rays in the observed object space corresponding to individual pixels of a light field sensor. It also allows identification of pixel beams (position, orientation, shape in the observed object space), in their extension around the chief rays. It thus provides a precise technique for calibrating all kinds of image acquisition devices, including light field data acquisition devices.

The invention claimed is:

1. Method of calibrating an image acquisition device comprising:
   emitting at least one light source pattern in an object space of said image acquisition device;
   adjusting one of said source patterns until an image pattern of said source pattern formed on a sensor of said image acquisition device exhibits a shape which centroid corresponds to a centroid of a reference pixel of said sensor, called a target image pattern; and
   analyzing said adjusted source pattern and estimating therefrom at least one characteristic of a pixel beam directed to said reference pixel from said adjusted source pattern.

2. The method of claim 1, further comprising determining a homomorphic transform between a source plane and an image plane of said image acquisition device, wherein said adjusting comprises iteratively modifying said source pattern to obtain said target image pattern, an inverse homomorphic transform of a difference between said image pattern and said target image pattern being determined at each iteration of said iteratively modifying step.

3. The method of claim 1, wherein said target image pattern is an image pattern exhibiting central symmetry centered on said reference pixel.

4. The method of claim 1, wherein analyzing said adjusted source pattern comprises determining a centroid of said adjusted source pattern, and wherein said estimating comprises determining a chief ray of said pixel beam, said chief ray being defined by said centroid of said adjusted source pattern and by a center of an entrance pupil through which said pixel beam reaches said reference pixel.

5. The method of claim 1, wherein said estimating also comprises:
   deconvolving said adjusted source pattern by an inverse homomorphic transform of said target image pattern, providing a local point spread function; and
   convolving said local point spread function with a transform of a filter representing a pixel fill function, providing a profile of said pixel beam for said reference pixel in said source plane.

6. The method of claim 1, further comprising alternately emitting a first light source pattern at a first distance to said image acquisition device in said object space and a second light source pattern at a second distance to said image acquisition device distinct from said first distance in said object space,
   wherein said step of determining an image pattern and said step of adjusting said source pattern are carried out for said first light source pattern and for said second light source pattern with a first target image pattern for said first light source pattern and a second target image pattern for said second light source pattern both centered on a same reference pixel, and wherein said analyzing step comprises analyzing said adjusted first source pattern and said adjusted second source pattern to estimate said at least one characteristic of said pixel beam directed to said reference pixel.

7. The method of claim 6, further comprising:

emitting a part of said first light source pattern and determining an associated first image pattern;

evaluating a sign of a source versus image magnification from said part of said first light source pattern and from said associated first image pattern;

emitting a part of said second light source pattern having the same geometry as the part of said first light source pattern, and determining an associated second image pattern;

evaluating a sign of a source versus image magnification from said part of said second light source pattern and from said associated second image pattern; and comparing both evaluated signs and determining therefrom a shape of said pixel beam between a plane located at said first distance and a plane located at said second distance.

8. A computer program product recorded on a non-transitory computer-readable medium, comprising program code instructions which, when executed on a computer, causes the computer to perform the steps of:

emitting at least one light source pattern in an object space of said image acquisition device;

adjusting one of said source patterns until an image pattern of said source pattern formed on a sensor of said image acquisition device exhibits a shape which centroid corresponds to a centroid of a reference pixel of said sensor, called a target image pattern; and analyzing said adjusted source pattern and estimating therefrom at least one characteristic of a pixel beam directed to said reference pixel from said adjusted source pattern.

9. A system for calibrating an image acquisition device comprising:

a first light source configured to emit at least a first light source pattern in an object space of said image acquisition device;

the image acquisition device comprising at least one sensor on which one of said emitted first light source patterns forms at least one first image pattern;

a module for adjusting said first light source pattern until one of said first image patterns exhibits a shape which centroid corresponds to a centroid of a reference pixel of said sensor, called a target first image pattern; and an analyzing unit for analyzing said adjusted first light source pattern and for estimating therefrom at least one characteristic of a pixel beam directed to said reference pixel from said adjusted first light source pattern.

10. The system of claim 9, further comprising a computing unit for determining a homomorphic transform between a source plane and an image plane of said image acquisition device, and wherein said module for adjusting comprises a feedback loop for iteratively modifying said first light source pattern to obtain said target first image pattern, an inverse homomorphic transform of a difference between said first image pattern and said target first image pattern being determined at each iteration of said feedback loop.

11. The system of claim 9, wherein said analyzing unit is configured to determine:

a centroid of said adjusted first light source pattern, and a chief ray of said pixel beam, said chief ray being defined by said centroid of said adjusted first light source pattern and by a center of an entrance pupil through which said pixel beam reaches said reference pixel.

12. The system of claim 9, wherein said analyzing unit also comprises:

a deconvolving module for deconvolving said adjusted first light source pattern by an inverse homomorphic transform of said target first image pattern, providing a local point spread function; and a convolving module for convolving said local point spread function with a transform of a filter representing a pixel fill function, providing a profile of said pixel beam for said reference pixel in said source plane.

13. The system of claim 9, further comprising a second light source configured to emit a second light source pattern in an object space of said image acquisition device, said first light source being located at a first distance to said image acquisition device and said second light source being located at a second distance to said image acquisition device distinct from said first distance.

14. The system of claim 13, wherein said second light source is located between said first light source and said image acquisition device, and wherein said second light source is a screen configured to take:

a transparent state in which said first light source pattern travels through said screen towards said image acquisition device; and an emitting state configured to emit a second light source pattern in an object space towards said image acquisition device.

15. The system of claim 13, further comprising:

an emitting control unit for controlling that said first light source emits a part of said first light source pattern;

an emitting control unit for controlling that said second light source emits a part of said second light source pattern having the same geometry as the part of said first light source pattern;

an evaluating module for evaluating a sign of a source versus image magnification from said part of said first light source pattern and from an associated first image pattern;

an evaluating module for evaluating a sign of a source versus image magnification from said part of said second light source pattern and from an associated second image pattern; and a comparison module for comparing both evaluated signs and determining therefrom a shape of said pixel beam between a plane located at said first distance and a plane located at said second distance.

* * * * *